(12) United States Patent
Tai et al.

(10) Patent No.: US 11,177,896 B2
(45) Date of Patent: Nov. 16, 2021

(54) TIME SYNCHRONIZATION DEVICE AND TIME SYNCHRONIZATION METHOD

(71) Applicant: ACCTON TECHNOLOGY CORPORATION, Hsinchu (TW)

(72) Inventors: Bang-Jun Tai, Miaoli County (TW); Yu-Yun Lee, Hsinchu (TW)

(73) Assignee: ACCTON TECHNOLOGY CORPORATION, Hsinchu (TW)

( * ) Notice: Subject to any disclaimer, the term of this patent is extended or adjusted under 35 U.S.C. 154(b) by 292 days.

(21) Appl. No.: 16/655,261

(22) Filed: Oct. 17, 2019

(65) Prior Publication Data

US 2020/0127752 A1    Apr. 23, 2020

(30) Foreign Application Priority Data

Oct. 23, 2018  (TW) .................................. 107137406

(51) Int. Cl.
*H04J 3/06* (2006.01)
(52) U.S. Cl.
CPC .................................. *H04J 3/0667* (2013.01)
(58) Field of Classification Search
CPC .............................. H04L 7/041; H04J 3/0667
See application file for complete search history.

(56) References Cited

U.S. PATENT DOCUMENTS

| | | | | |
|---|---|---|---|---|
| 2005/0084032 A1* | 4/2005 | Rosen | .................. | H04B 1/7163 375/295 |
| 2005/0084033 A1* | 4/2005 | Rosen | ..................... | H04B 1/69 375/295 |
| 2005/0100076 A1* | 5/2005 | Gazdzinski | .......... | H04B 1/7176 375/130 |
| 2011/0035511 A1* | 2/2011 | Biederman | ........... | H04J 3/0667 709/248 |
| 2011/0286560 A1* | 11/2011 | Pignatelli | .............. | H04J 3/0655 375/356 |
| 2013/0121347 A1* | 5/2013 | Saito | ..................... | H04J 3/0697 370/474 |
| 2014/0119391 A1* | 5/2014 | Yamamoto | ............ | H04J 3/0688 370/516 |
| 2014/0226984 A1* | 8/2014 | Roberts | .................. | H04B 10/27 398/66 |

(Continued)

*Primary Examiner* — Hassan A Phillips
*Assistant Examiner* — Prenell P Jones
(74) *Attorney, Agent, or Firm* — CKC & Partners Co., LLC

(57) ABSTRACT

A time synchronization device performs a time synchronization process with a device that provides first and second time values. The time synchronization device includes a packet processing circuit, a time counting circuit, and a processor. The packet processing circuit includes a timestamp counter having an N-bit length, and the packet processing circuit provides first to third time counting values. The processor calculates the first offset value based on the first and second time values and the first and second time counting values; calculates the first adjustment value based on the first offset value and the reciprocal of the frequency of the time counting circuit; calculates a second quotient value and a second remainder value based on the first adjustment value and the N-bit length; and calculates the receiving time of the second synchronization packet based on the N-bit length, the second quotient value, and the third time counting value.

20 Claims, 2 Drawing Sheets

(56) References Cited

U.S. PATENT DOCUMENTS

| | | | | |
|---|---|---|---|---|
| 2015/0381299 A1* | 12/2015 | Yang | ............... | H04J 3/0697 |
| | | | | 370/509 |
| 2017/0063481 A1* | 3/2017 | Pauwels | ............. | H04L 12/2878 |
| 2017/0099131 A1* | 4/2017 | Bosch | .................. | H04J 3/0667 |
| 2017/0257836 A1* | 9/2017 | Ho | ....................... | H04L 7/0004 |
| 2017/0346588 A1* | 11/2017 | Prins | ................... | H04J 3/0667 |
| 2019/0081720 A1* | 3/2019 | Barry | ................... | H04J 3/0667 |
| 2019/0349426 A1* | 11/2019 | Smith | ................ | G06F 16/1824 |
| 2019/0379474 A1* | 12/2019 | Coulter | ............... | H04J 3/0697 |
| 2019/0379475 A1* | 12/2019 | Seethamraju | ........ | H04J 3/0667 |

\* cited by examiner

TIME SYNCHRONIZATION DEVICE AND TIME SYNCHRONIZATION METHOD

RELATED APPLICATIONS

This application claims priority to Taiwan Application Serial Number 107137406, filed on Oct. 23, 2018, which is herein incorporated by reference.

BACKGROUND

Technical Field

The invention relates to a time synchronization device and a time synchronization method, and more particularly to a time synchronization device and a time synchronization method for obtaining time-of-day (TOD).

Description of Related Art

According to the precision time protocol in complied with IEEE 1588, the time offset between the master device (Master) and the slave device (Slave) is obtained from the transmitting time T1 of the synchronization packet (Sync) at the master device (Master), the receiving time T2 of the synchronization packet received at the slave device (Slave), the transmitting time T3 of the delay request message packet (Delay Request) at the slave device and the receiving time T4 of the delay request message packet at the master device, and the slave device then synchronizes its clock time with the master device accordingly. Generally, a chip responsible for forwarding packets has a timestamp counter which may provide the receiving time or the transmitting time of a packet.

However, some timestamp counters with limited numbers of bits in chips can only provide a time counting value which indicates a time within a short time period not a time and date (time-of-day (TOD)). For example, for a 32-bit timestamp counter in a chip, if the counting unit is nanosecond (ns), the timestamp counter performs time counting in a time period of about 4.29 seconds, and provide counting value (i.e. a value from 0-4.29 seconds) as the receiving time or the transmitting time of a packet when the packet is received or transmitted, resulting in unable to obtain the TOD at the reception or transmission of the packet. For the above situation, a method of obtaining the TOD is needed for precise synchronization with the master device.

SUMMARY

One aspect of the invention is to provide a time synchronization device which is adapted to perform a time synchronization process with a device. The device is capable of transmitting a first synchronization packet, transmitting a first delay response message packet in response to a first delay request message packet, providing a first time value through the first synchronization packet or a first follow up packet and providing a second time value through the first delay response message packet. The time synchronization device includes a packet processing circuit, a time counting circuit and a processor. The packet processing circuit has a timestamp counter with an N-bit length, and is configured to: receive the first synchronization packet and the first delay response message packet; provide a first time counting value and a second time counting value respectively corresponding to the times at which the first synchronization packet and the first delay request message packet are received; and provide a third time counting value corresponding to receiving the first synchronization packet again by the timestamp counter. The time counting circuit is coupled to the packet processing circuit, and is configured to perform time counting in accordance with a frequency. The processor is configured to: calculate a first offset value based on the first time value, the second time value, the first time counting value and the second time counting value; calculate a first adjustment value based on the first offset value and a reciprocal of the frequency; calculate a second quotient value and a second remainder value based on the first adjustment value and the N-bit length; and calculate a receiving time of the second synchronization packet based on the N-bit length, the second quotient value and the third time counting value.

Another aspect of the invention is to provide a time synchronization method which is adapted to be applied in a time synchronization device that performs a time synchronization process with a device. The time synchronization device having a timestamp counter with an N-bit length and a time-of-day (TOD) counter for time counting in accordance with a frequency. The time synchronization method includes the following steps. A first time value and a second time value from a packet sent by the device is obtained, and the packet includes a first packet, a second packet or a fourth packet. A first time counting value and a second time counting value respectively corresponding to the times at which the first packet and transmitting the second packet are received are obtained. A first offset value is calculated based on the first time value, the second time value, the first time counting value and the second time counting value. A first adjustment value is calculated based on the first offset value and a reciprocal of the frequency. A second quotient value and a second remainder value are calculated based on the first adjustment value and the N-bit length. A third time counting value corresponding to reception of a fifth packet is obtained. A time of the reception of the fifth packet is calculated based on the N-bit length, the second quotient value and the third time counting value.

Therefore, according to the aspects of the invention, the time synchronization method and the time synchronization method of the invention can calculate TOD at the transmission or reception of a packet even if the chip thereof can only provide a limited counter value, and therefore the time synchronization can be performed more precisely.

BRIEF DESCRIPTION OF THE DRAWINGS

Embodiments and advantages thereof can be more fully understood by reading the following description with reference made to the accompanying drawings as follows.

DETAILED DESCRIPTION

Figure 1:
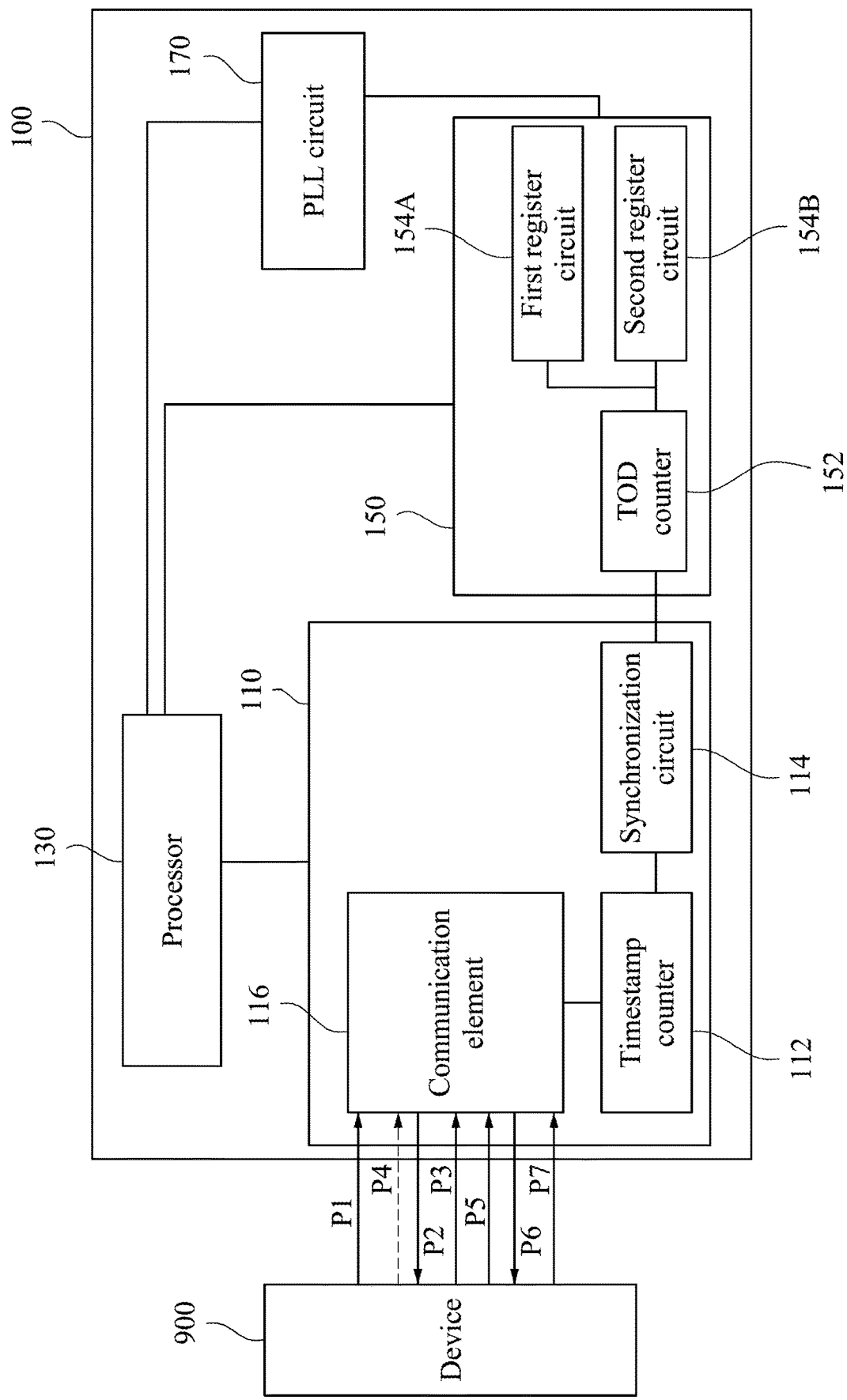
FIG. 1 is a schematic diagram of a time synchronization device in accordance with some embodiments of the invention.

The spirit of the disclosure is clearly described hereinafter accompanying with the drawings and detailed descriptions. After realizing preferred embodiments of the disclosure, any persons having ordinary skill in the art may make various modifications and changes according to the techniques taught in the disclosure without departing from the spirit and scope of the disclosure. Moreover, the disclosure may repeat reference numerals and/or letters in the various examples. This repetition is for the purpose of simplicity and clarity and does not in itself dictate a relationship between the various embodiments and/or configurations discussed.

Referring to FIG. 1, which illustrates a schematic diagram of a time synchronization device 100 in accordance with some embodiments of the invention. In the embodiment, the time synchronization device 100 and the device 900 are respectively a slave device and a master device. The slave device performs a time synchronization process with the master device during a time period. In the time synchronization process, the device 900 transmits a first packet to obtain a first time value T1, obtains a second time value T4 by receiving a second packet corresponding to the first packet, and then transmits a third packet with the second time value T4 in response to the second packet. In supplement, the first time value T1 may be provided either by a fourth packet or the first packet. The way of providing the first time value will be described afterwards. The time synchronization device 100 obtains the first time value T1 from the first packet, obtains a first time counting value T2 after reception of the first packet, obtains a second time counting value T3 after transmitting the second packet, and obtains the second time value T4 from the third packet. In the embodiment, the IEEE 1588 precision time protocol is exemplified. The time synchronization process is performed in accordance with the IEEE 1588 precision time protocol, and therefore, the first packet is a first synchronization packet P1, the second packet is a first delay request message packet P2, the third packet is a first delay response message packet P3, the fourth packet is a follow up packet P4, the fifth packet is a second synchronization packet P5, the sixth packet is a second delay request message packet P6, and the seventh packet is a second delay response message packet P7. The device 900 has a clock element that is capable of providing time-of-day (TOD). In the embodiment, the device 900 provides an Ordinary Clock or a Boundary Clock. In the time period, the device 900 provides the transmitting time (labeled as T1) through the synchronization packet P1, and provides the receiving time (labeled as T4) of the delay request message packet through the first delay response message packet P3. In the embodiment, the first synchronization packet P1 and the second synchronization packet P5 are transmitted at different cycles, the first delay request message packet P2 and the second delay request message packet P6 are transmitted at different cycles, and the first delay response message packet P3 and the second delay response message packet P7 are transmitted at different cycles. In another embodiment, the device 900 may also provide the first time value T1 through a follow up packet (Follow Up Message). The time synchronization device 100 may be a slave device, or may be a clock synchronization device having dual roles of slave device and master device. The time synchronization device 100 may be a network device, such as a switch or a router.

The time synchronization device 100 includes a packet processing circuit 110, a processor 130, a time counting circuit 150 and a phase-locked loop (PLL) circuit 170. In the embodiment, the packet processing circuit 110 includes a timestamp counter 112, a synchronization circuit 114 and a communication element 116, and the time counting circuit 150 includes a time-of-day (TOD) counter 152, a first register circuit 154A and a second register circuit 154B.

The communication element 116 is configured to receive and transmit packets. In the embodiment, the communication element 116 may be an input/output (I/O) port or an integrated circuit responsible for receiving and transmitting packets. In the embodiments of the invention, the communication element 116 receives the first synchronization packet P1, the first delay response message packet P3 and the fifth synchronization packet P5, and transmits the first delay request message packet P2 and the second delay request message packet P6.

The timestamp counter 112 is a counter with N bits length for providing a time counting value in a cycle period. If N is 32 and the unit of the time counting value is nanosecond, the timestamp counter 112 resets the time counting value per counting times of $2^{32}$. For example, after being counted from 0 to $2^{32}-1$, the time counting value is reset to be 0 for the next counting period. In the embodiment, the timestamp counter 112 resets the time counting value for about every 4.29 seconds. That is to say, the timestamp counter 112 can only provide the time counting value from 0 to 4.29 seconds. In other words, when the packet processing circuit 110 receives the synchronization packet P1, the receiving time T2 provided by the timestamp counter 112 is one of the time counting value between 0-4.29 seconds. Also, when the packet processing circuit 110 transmits the first delay request message packet P2, the transmitting time T3 provided by the timestamp counter 112 is also one of the time counting value between 0-4.29 seconds. The synchronization circuit 114 is configured for synchronization between the timestamp counter 112 and the time counting circuit 150. For example, the time counting circuit 150 may set a value into the synchronization circuit 114 to synchronize the timestamp counter 112 on counting, such that the time counting circuit 150 and the timestamp counter 112 can be synchronized with respect to time counting.

The processor 130 may obtain the transmitting time T1 of the synchronization packet P1, the time counting value at the reception of the synchronization packet P1, the time counting value at the transmission of the delay request message packet P2 and the receiving time T4 of the delay request message packet P2 from the packet processing circuit 110. It is noted that the TOD of the receiving time T2 of the synchronization packet P1 and the TOD of the transmitting time T3 of the delay request message packet P2 are obtained by calculating the time counting values. The TOD calculation and the execution of the time synchronization process in accordance with the embodiments by the processor 130 can be referred to the time synchronization process described in detail afterwards. An additional description is provided herein, in which the TOD in accordance with the embodiments may correspond to a particular time of a day or alternatively include a particular time of a particular day, and the TOD may be represented with a value in accordance with the TOD.

The time counting circuit 150 performs time counting in accordance with a frequency. In the embodiments of the invention, the phase-locked loop circuit 170 outputs a clock pulse with respect to the frequency for the time counting circuit 150 to perform time counting. It is noted that the phase-locked loop circuit 170 may also be integrated in the time counting circuit 150 and may be a wide area network phase-locked loop (WAN PLL) circuit for practical implementation. In the embodiment, the time counting circuit 150 further includes a TOD counter 152, a first register circuit 154A and a second register circuit 154B. The TOD counter 152 performs time counting in accordance with the frequency. The first register circuit 154A provides a counter initial value for the TOD counter 152 to start time counting therefrom. The second register circuit 154B provides a counter increment value for the TOD counter 152, such that the TOD counter 152 uses the sum of the counter increment value and the current time counting value to start time counting therefrom. In specific, during the operation of the time counting circuit 150, in this example, the TOD counter 152 performs time counting with a frequency of 4 KHz (meaning counting one time per 250 μs) for continuously increasing the time counting value. The TOD counter 152 starts increasing the time counting value from the counter initial value provided by the first register circuit 154A, or else starts increasing the time counting value from the sum of the counter increment value provided by the second register circuit 154B and the current time counting value of the TOD counter 152. It is noted that although the time counting circuit 150 has ability to provide the time of day, in some circumstances, e.g., restarting after power off or being disconnected from the master device 900, the time counting value counted by the time counting circuit 150 would have a larger shift from the time counted by the master device 900, and therefore the counter initial value needs to be set first. Thus, the processor 130 calculates a first adjustment value based on the offset value and the reciprocal of the frequency, and then sets the first adjustment value as the counter initial value of the TOD counter 152 to start time counting therefrom. In the embodiment, the processor 130 may set the first adjustment value into the first register circuit 154A or the second register circuit 154B, so as to set the counter initial value of the TOD counter 152. Alternatively, the processor 130 may set the first adjustment value into the first register circuit 154A or the second register circuit 154B depending on whether the offset value exceeds a predefined value. For example, if the offset value is greater than the predefined value, the first adjustment value is set into the first register circuit 154A. The first adjustment value is set into the second register circuit 154B if the offset value is less than the predefined value. Furthermore, in another embodiment, the processor 130 calculates the first adjustment value based on the first time counting value T2, the offset value and the reciprocal of the frequency. The calculation process of obtaining the first adjustment value will be described afterwards. It is additionally described that the time and the time counting value in accordance with the embodiments may be an N-bit binary string that can be converted to a particular time or a particular time of a particular day.

Figure 2:
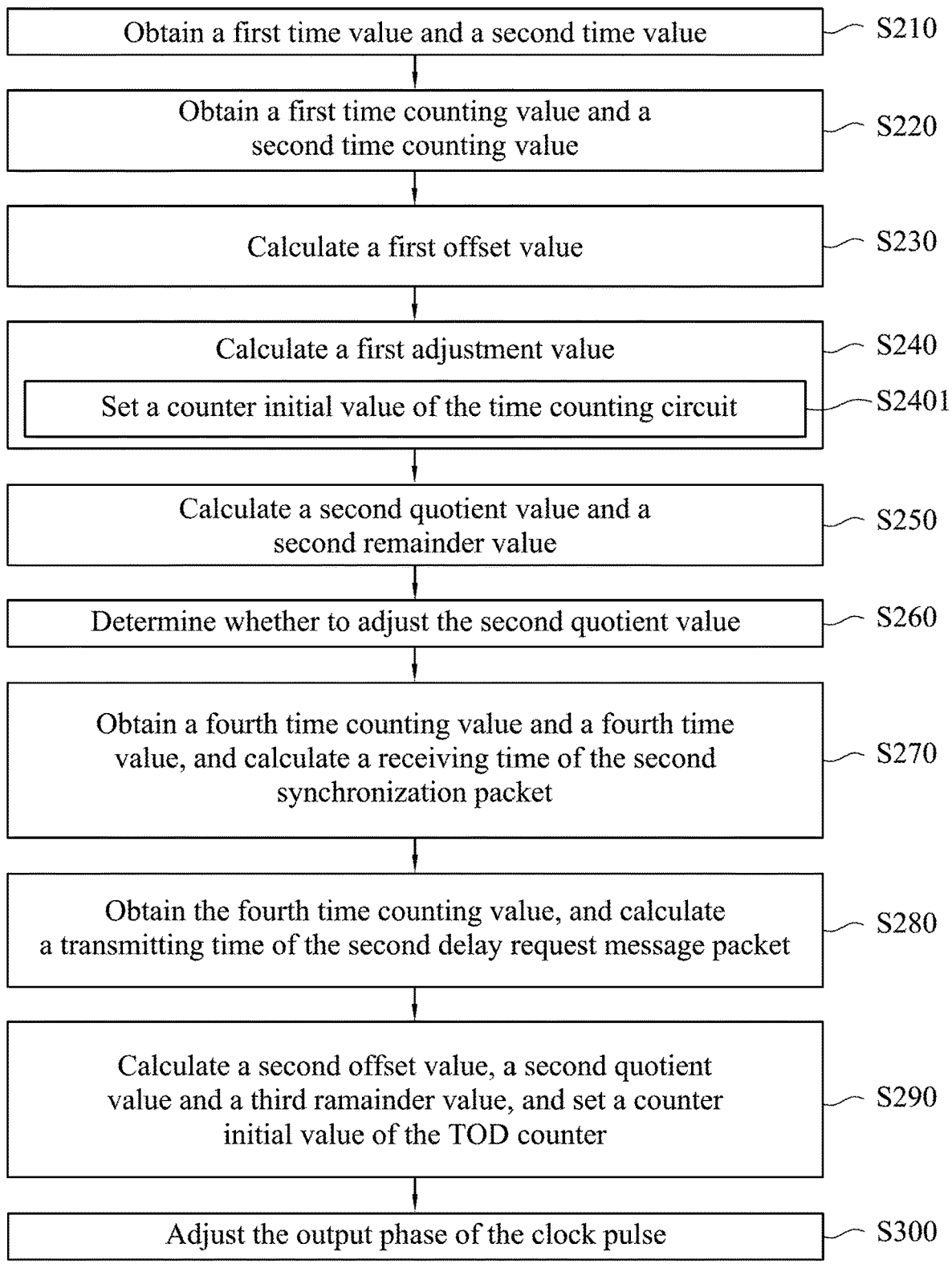
FIG. 2 is a flowchart of a time synchronization method in accordance with some embodiments of the invention.

FIG. 2 is a flowchart diagram of the time synchronization method illustrated in accordance with the embodiments of the invention. The flowchart diagram of FIG. 2 includes Steps S210 to S300. Please also refer to FIG. 1 for the description of the specific processes of the time synchronization process implemented by the time synchronization device 100.

In Step S210, a first time value and a second time value are obtained in the packet sent from the device 900. In the embodiments of the invention, the device 900 transmits the first synchronization packet P1, the transmitting time of the first synchronization packet P1 transmitted by the device 900 is the first time value, and the receiving time of the first synchronization packet P1 received by the time synchronization device 100 is defined as a first time counting value. The transmitting time of the first delay request message packet P2 transmitted by the time synchronization device 100 is defined as a second time counting value, and the receiving time of the first delay request message packet P2 received by the device 900 is defined as the second time value. It is noted that in some embodiments, the first time value may also be obtained from the follow up packet P4, while the second time value may also be obtained from the first delay response message packet P3. The first time value and the second time value in accordance with the embodiment may be viewed as the transmitting time T1 of the synchronization packet and the receiving time T4 of the delay request packet in accordance with the IEEE 1588 precision time protocol.

In Step S220, the first time counting value and the second time counting value are obtained based on the receiving time of the first synchronization packet and the transmitting time of the first delay request message packet. Specifically, in case the packet processing circuit 110 receives the first synchronization packet P1 or transmits the first delay request message packet P2, the communication element 116 is responsible for reception and transmission of the packet at that time the timestamp counter 112 provides the first time counting value and the second time counting value. The first time counting value and the second time counting value in accordance with the embodiment may be viewed as the receiving time T2 of the synchronization packet and the transmitting time T3 of the delay request message packet in accordance with the IEEE 1588 precision time protocol.

In Step S230, a first offset value is calculated based on the first time value, the second time value, the first time counting value and the second time counting value. Specifically, according to the method of calculating the offset value defined in the IEEE 1588 precision time protocol, the processor 130 calculates the first time value, the second time value, the first time counting value and the second time counting value respectively corresponding to T1, T2, T3 and T4 to obtain the first offset value OFFSET1. In the embodiments of the invention, each of the first time counting value and the second time counting value is a value among the $0$-$2^N$ nanoseconds; when N is 32, the value is in 0-4.29 seconds.

In Step S240, a first adjustment value is calculated based on the first offset value and the reciprocal of the frequency. In this step, the processor 130 divides the first offset value OFFSET1 by the reciprocal of the frequency of the TOD counter 152 to obtain a first quotient value Q1 and a first remainder value R1. For better understanding, the relationship of the parameters is represented as the following equation:

$$\text{OFFSET1} = (f^{-1} \times Q1) + R1, \text{ where } f^{-1} \text{ is the reciprocal}$$
of the frequency of the TOD counter 152.

Afterwards, the processor 130 calculates the multiplication of the reciprocal of the frequency and the first quotient value Q1 (the reciprocal of the frequency×the first quotient value Q1) to obtain the first adjustment value. In another embodiment, the processor 130 adds the first time counting value by the first offset value OFFSET1 to obtain a summed value, and then divides the summed value by the reciprocal of the frequency of the TOD counter 152 to obtain the first quotient value Q1 and the first remainder value R1. Afterwards, the processor 130 calculates the first adjustment value according to the aforementioned method. This step may further include Step S2401 in which the counter initial value of the time counting circuit 150 is set based on the first adjustment value. In this step, the first adjustment value is used as the counting initial value of the time counting circuit 150, such that the time counting circuit 150 starts time counting at a relatively precise time. In the embodiment, the processor 130 stores the first adjustment value in the first register circuit 154A, the TOD counter 152 may set the value stored into the first register circuit 154A as the counter initial value to start counting. Alternatively, the processor 130 may store the counter increment value corresponding to the first adjustment value in the second register circuit 154B. It is additionally described that those ordinary skilled in the art may utilize various calculating methods to calculate the counter increment value corresponding to the first adjustment value. For example, the difference obtained by subtracting the current counting value of the TOD counter 152 from the first adjustment value is used as the counter increment value, such that the sum of the current counting value of the TOD counter 152 and the counter increment value is equivalent to the first adjustment value. That is, various methods for the operations on the current counting value of the TOD counter 152 and the counter increment value to obtain the first adjustment value can all be used as the calculation methods of the counter increment value. In another embodiment, whether the processor 130 stores the first adjustment value in the first register circuit 154A or the second register circuit 154B depends on the first offset value. For example, if the first offset value is greater than a predetermined value, the processor 130 stores the first adjustment value in the first register circuit 154A; if the second offset value is less than the predetermined value, the processor 130 stores the first adjustment value in the second register circuit 154*6*.

In Step S250, a second quotient value and a second remainder value are calculated depending on the first adjustment value and the N-bit length. For better description, please refer to the following equation first:

the first adjustment value(i.e. $f^{-1} \times Q1$)=$(Q2 \times 2^N)$+$R2$.

According to the above equation, in the embodiment, the processor 130 divides the first adjustment value by $2^N$ to obtain the second quotient value Q2 and the second remainder value R2, where N is the bit length of the timestamp counter 112.

In Step S260, a third time counting value corresponding to the reception of the second synchronization packet P5 and the second remainder value R2 are obtained to determine whether the second quotient value Q2 is to be adjusted. In the embodiment, when the processor 130 receives the second synchronization packet P5 in the next time period, the processor 130 obtains the third time counting value from the time counting value provided by the timestamp counter 112. In addition, the third time counting value is further compared with the second remainder value R2 to determine whether to adjust the second quotient value Q2. In the embodiment, if it is determined that the third time counting value is less than the second remainder value R2, the processor 130 increments the second quotient value Q2 by 1; otherwise, the second quotient value Q2 remains unchanged.

In Step S270, a fourth time counting value is obtained based on the transmitting time of the second delay request message packet P5, a fourth time value is obtained based on the receiving time of the second delay request message packet P5, and the receiving time T2 of the second synchronization packet P5 is calculated based on the N-bit length, the second quotient value Q2 and the third time counting value. In specific, the receiving time T2 of the second synchronization packet P5 may be obtained by the following equation:

T2=the time counting value of the timestamp counter+$(Q2 \times 2^N)$.

In the embodiment, when the packet processing circuit 110 receives the second synchronization packet P5, the processor 130 obtains the time counting value from the timestamp counter 112, and then adds the multiplication of the second quotient value Q2 and $2^N$ with the time counting value to obtain the receiving time T2 of the second synchronization packet P5.

In Step S280, to obtain the fourth time counting value by transmitting the second delay request message packet P6, and the transmitting time T3 of the second delay request message packet P6 is calculated based on the bit length N of the timestamp counter 112, the second quotient value Q2 and the fourth time counting value. In specific, the transmitting time T3 of the second delay request message packet P6 may be represented by the following equation:

T3=the time counting value of the timestamp counter+$(Q2 \times 2^N)$.

In the embodiment, when the packet processing circuit 110 transmits the second delay request message packet P6 to the device 900, the processor 130 obtains the time counting value which is obtained at the transmission of the second delay request message packet P6, and then, as shown in the above equation, the transmitting time T3 of the second delay request message packet P6 is obtained by adding the time counting value with the multiplication of the second quotient value Q2 and $2^N$. Further, the device 900 obtains the fourth time value from the reception of the second delay request message packet P6, and provides the fourth time value through the second delay response message packet P7.

Thus, even if the timestamp counter 112 can not provide the TOD due to a limited bit length, e.g., the packet processing circuit 110 is equipped with the timestamp counter with a limited number of bits for various reasons, the receiving time T2 of the synchronization packet and the transmitting time T3 of the delay request message packet can be calculated by performing the aforementioned steps in accordance with the embodiments of the invention, and then the TOD is provided in the subsequent synchronization process for precise time synchronization.

Further, in the embodiments of the invention, the time synchronization device 100 may continue Step S290 to keep minimizing the time synchronization error with respect to the device 900.

In Step S290, the second offset value is obtained by calculating the third time value, the fourth time value, the third time counting value and the fourth time counting value, a third quotient value Q3 and a third remainder value R3 are calculated based on the second offset value and the reciprocal of the frequency; the second offset value is then set as the counter initial value of the TOD counter 152 based on the time counting value of the TOD counter 152 and a second adjustment value. In the embodiment, the calculation methods of the second offset value and the first offset value are similar, but the third time counting value is the receiving time T2 of the second synchronization packet P5 calculated in Step S270, while the fourth time counting value is the transmitting time T3 of the second delay request message packet P6 calculated in Step S290, thereby obtaining the second offset value. Afterwards, for convenience of description, the second offset value may be simplified as the following equation:

|the second offset value|=$(f^1 \times Q3)$+$R3$.

According to the above equation, in the embodiments of the invention, the processor 130 divides the absolute value of the second offset value by the reciprocal of the frequency to obtain the third quotient value Q3 and the third remainder value R3. Then, the processor 130 obtains the second adjustment value from the multiplication of the reciprocal of the frequency and the third quotient value Q3, and adds the second adjustment value and the time counting value of the TOD counter 152 as the counter initial value of the TOD counter 152 to restart counting. In the embodiment, the processor 130 stores the second adjustment value in the second register circuit 154B to set the counter initial value of the TOD counter 152. Differing from the first register circuit 154A, the TOD counter 152 adds the value of the second register circuit 154B with the current time counting value to obtain a summed value, and then uses the summed value to start time counting. After this step, the time synchronization error between the TOD counter 152 of the time counting circuit 150 and the device 900 is reduced to be less than the reciprocal of the frequency. Taking the frequency of 4 KHz as an example, the synchronization error can be reduced to be less than 250 µs. Step S300 may be further performed to keep minimizing the time synchronization error with respect to the device 900.

In Step S300, the output phase of the clock pulse is adjusted based on the third remainder value R3. In the embodiment, the TOD counter 152 performs time counting based on the clock pulse with the frequency and outputted by the phase-locked loop circuit 170, and in this step, the processor 130 sets the output phase of the phase-locked loop circuit 170 based on the third remainder value R3, so as to adjust the output time of the clock pulse, thereby delaying or hastening the time counting period of the TOD counter 152. For example, if the third remainder value R3 is 10, the processor 130 controls the phase-locked loop circuit 170 to generate the output phase earlier by 10 nanoseconds. Thus, in the embodiment, when the phase-locked loop circuit 170 outputs the clock pulse with the frequency of 4 KHz, the outputted phase can be adjusted to make the time synchronization error between the TOD counter 152 of the time counting circuit 150 and the device 900 less than 1 µs.

According to the time synchronization device and the time synchronization method in accordance with the embodiments of the invention, the TOD at the transmission or reception of a packet can be obtained even when the bit length of the timestamp counter is limited, and time synchronization can be performed more precisely, thereby reducing time synchronization error.

In some embodiments, the processor 130, the packet processing circuit 110 and the time counting circuit 150 may be a circuit with functions of storage, computation, data reading, signal or information reception and transmission or another integrated circuit or module with equivalent functions, including a central processing unit (CPU), a chip or a field programmable gate array (FPGA).

Although the invention is described above by means of the implementation manners, the above description is not intended to limit the invention. A person of ordinary skill in the art can make various variations and modifications without departing from the spirit and scope of the invention, and therefore, the protection scope of the invention is as defined in the appended claims.

What is claimed is:

1. A time synchronization device adapted to perform a time synchronization process with a device, the device capable of transmitting a first synchronization packet, transmitting a first delay response message packet in response to a first delay request message packet, providing a first time value through the first synchronization packet or a first follow up packet, and providing a second time value through the first delay response message packet, the time synchronization device comprising:
   a packet processing circuit having a timestamp counter with an N-bit length, the packet processing circuit configured to:
      receive the first synchronization packet and the first delay response message packet;
      provide, by the timestamp counter, a first time counting value and a second time counting value respectively corresponding to the times at which the first synchronization packet and the first delay request message packet are received; and
      provide, by the timestamp counter, a third time counting value corresponding to the time at which the first synchronization packet is received again;
   a time counting circuit coupled to the packet processing circuit and configured to perform time counting in accordance with a frequency; and
   a processor configured to: calculate a first offset value based on the first time value, the second time value, the first time counting value and the second time counting value; calculate a first adjustment value based on the first offset value and a reciprocal of the frequency; calculate a second quotient value and a second remainder value based on the first adjustment value and the N-bit length; and calculate a receiving time of the second synchronization packet based on the N-bit length, the second quotient value and the third time counting value.

2. The time synchronization device of claim 1, wherein the processor is further configured to: calculate a first quotient value and a first remainder value based on the first offset value and the reciprocal of the frequency; and multiply the reciprocal of the frequency and the first quotient value to obtain the first adjustment value.

3. The time synchronization device of claim 2, wherein the processor is further configured to set a counter initial value or a counter increment value of the time counting circuit based on the first adjustment value.

4. The time synchronization device of claim 3, wherein the processor is further configured to adjust the second quotient value in response to a determination result in which the third time counting value is smaller than the second remainder value.

5. The time synchronization device of claim 1, wherein the processor is further configured to: calculate a first quotient value and a first remainder value based on the first time counting value, the first offset value and the reciprocal of the frequency; and multiply the reciprocal of the frequency and the first quotient value to obtain the first adjustment value.

6. The time synchronization device of claim 1, wherein the packet processing circuit is further configured to: transmit a second delay request message packet; provide a fourth time counting value by the timestamp counter; and calculate a transmission time of the second delay request message packet based on the N-bit length, the second quotient value and the fourth time counting value by the processor.

7. The time synchronization device of claim 6, wherein the packet processing circuit is further configured to receive a second synchronization packet and a second delay response message packet;
   wherein the processor is further configured to:
      calculate a second offset value based on a third time value, a fourth time value, the third time counting value and the fourth time counting value;
      calculate a third quotient value and a third remainder value based on the second offset value and the reciprocal of the frequency; and
      calculate a second adjustment value based on the third quotient value and the reciprocal of the frequency to set a counter initial value of the time counting circuit.

8. The time synchronization device of claim 7, wherein the processor is further configured to multiply the reciprocal of the frequency and the third quotient value to obtain the second adjustment value.

9. The time synchronization device of claim 7, further comprising:
a phase-locked loop (PLL) circuit configured to output a signal corresponding to the frequency;
wherein the processor is further configured to adjust a phase of the outputted signal based on a third remainder value.

10. The time synchronization device of claim 7, wherein the time counting circuit further comprises:
a first register circuit configured to store the first adjustment value; and
a second register circuit configured to store the second adjustment value.

11. A time synchronization method adapted to be applied in a time synchronization device that performs a time synchronization process with a device, the time synchronization device having a timestamp counter with an N-bit length and a time-of-day (TOD) counter for time counting in accordance with a frequency, the time synchronization method comprising the following steps:
obtaining a first time value and a second time value from a packet sent by the device, wherein the packet comprises a first packet, a second packet or a fourth packet;
obtaining a first time counting value and a second time counting value respectively corresponding to the times at which the first packet and transmitting the second packet are received;
calculating a first offset value based on the first time value, the second time value, the first time counting value and the second time counting value;
calculating a first adjustment value based on the first offset value and a reciprocal of the frequency;
calculating a second quotient value and a second remainder value based on the first adjustment value and the N-bit length;
obtaining a third time counting value corresponding to reception of a fifth packet; and
calculating a time of the reception of the fifth packet based on the N-bit length, the second quotient value and the third time counting value.

12. The time synchronization method of claim 11, wherein the step of calculating the first adjustment value comprises:
calculating a first quotient value and a first remainder value based on the first offset value and the reciprocal of the frequency; and
multiplying the reciprocal of the frequency and the first quotient value to obtain the first adjustment value.

13. The time synchronization method of claim 12, further comprising:
setting a counter initial value or a counter increment value based on the first adjustment value.

14. The time synchronization method of claim 12, further comprising:
adjusting the second quotient value if the third time counting value is less than the first remainder value.

15. The time synchronization method of claim 11, wherein calculating the first adjustment value based on the first offset value and the reciprocal of the frequency further comprises:
calculating the first adjustment value based on the time counting value, the first offset value and the reciprocal of the frequency.

16. The time synchronization method of claim 11, further comprising:
calculating a transmission time of a sixth packet based on the N-bit length, the second quotient value and a fourth time counting value;
wherein the fourth time counting value is obtained corresponding to transmission of the sixth packet.

17. The time synchronization method of claim 16, further comprising:
calculating a second offset value based on a third time value corresponding to transmitting the fifth synchronization packet, a fourth time value corresponding to receiving the sixth packet, the reception time and the transmission time;
calculating a third quotient value and a third remainder value based on the second offset value and the reciprocal of the frequency;
calculating a second adjustment value based on the third quotient value and the reciprocal of the frequency; and
setting a counter initial value based on the second adjustment value.

18. The time synchronization method of claim 17, wherein the second adjustment value is obtained by multiplying the reciprocal of the frequency and the third quotient value.

19. The time synchronization method of claim 17, wherein the step of setting the counter initial value corresponding to the second adjustment value is setting the counter initial value based on a current time counting value of the TOD counter and the second adjustment value.

20. The time synchronization method of claim 17, further comprising:
adjusting an output phase corresponding to the frequency based on a third remainder value.

* * * * *